United States Patent [19]

Creedon

[11] Patent Number: 4,510,972
[45] Date of Patent: Apr. 16, 1985

[54] BOW ACTION VALVE
[75] Inventor: Richard L. Creedon, San Diego, Calif.
[73] Assignee: GA Technologies Inc., San Diego, Calif.
[21] Appl. No.: 425,568
[22] Filed: Sep. 28, 1982
[51] Int. Cl.³ .............................................. F16K 7/12
[52] U.S. Cl. .............................. 137/625.28; 137/601; 251/DIG. 2
[58] Field of Search .............. 137/601, 625.28, 512.15, 137/855; 251/DIG. 2

[56] References Cited

U.S. PATENT DOCUMENTS

| | | | |
|---|---|---|---|
| 2,539,293 | 1/1951 | Balzer | 98/40 |
| 2,705,595 | 6/1953 | Carlson et al. | 236/13 |
| 2,784,740 | 3/1957 | Stageberg | 251/DIG. 2 |
| 2,890,717 | 11/1955 | Werder | 137/521 |
| 3,073,525 | 1/1961 | Cislo | 236/49 |
| 3,292,657 | 3/1964 | Reynolds | 137/512.15 |
| 3,363,536 | 1/1968 | Dean, Jr. | 98/41 |
| 3,425,443 | 2/1969 | Smith | 137/512.15 |
| 3,690,344 | 9/1972 | Brumm | 137/625.28 |
| 3,939,868 | 2/1976 | Logsdon | 137/517 |
| 3,951,168 | 4/1976 | Roberts | 251/DIG. 2 |

FOREIGN PATENT DOCUMENTS 298612  7/1954  Switzerland ................... 137/625.28

Primary Examiner—Alan Cohan
Attorney, Agent, or Firm—Fitch, Even, Tabin & Flannery

[57] ABSTRACT

A bow action valve for controlling the flow of material includes a valve body having at least one orifice and a closure plate. The closure plate is secured in front of the valve body at two opposite ends, with one end secured at a substantially fixed location on the valve body, and the other end free to move toward and away from the fixed end. The free end may be moved with a component of motion in the direction of the fixed end to bow the plate means and thereby vary the distance between the plate and the orifice to control the flow of material through the valve body.

15 Claims, 6 Drawing Figures

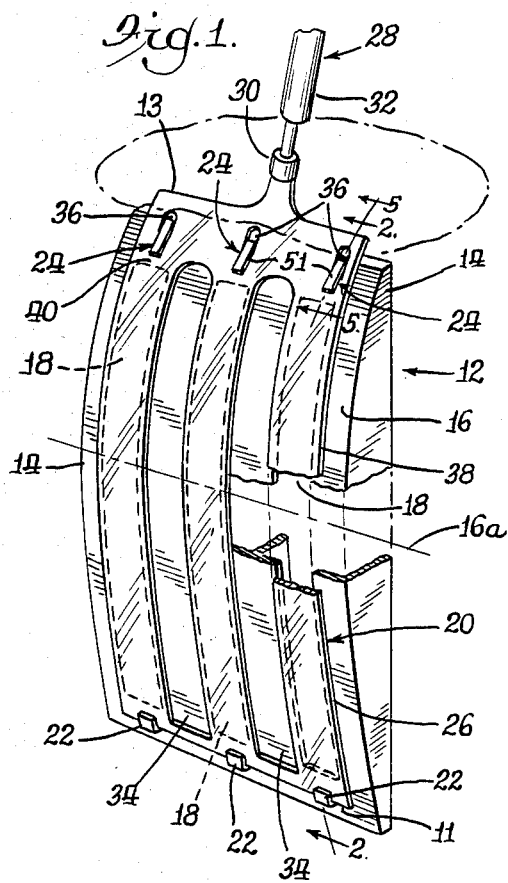
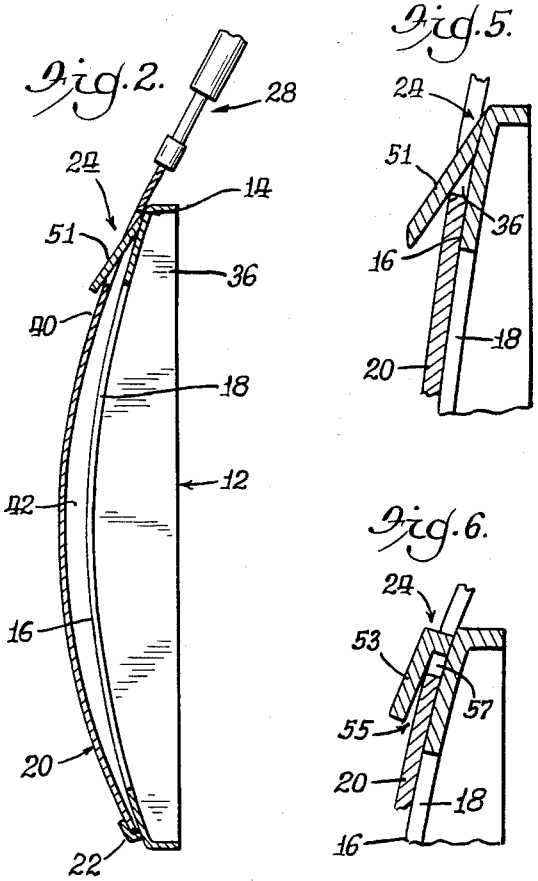
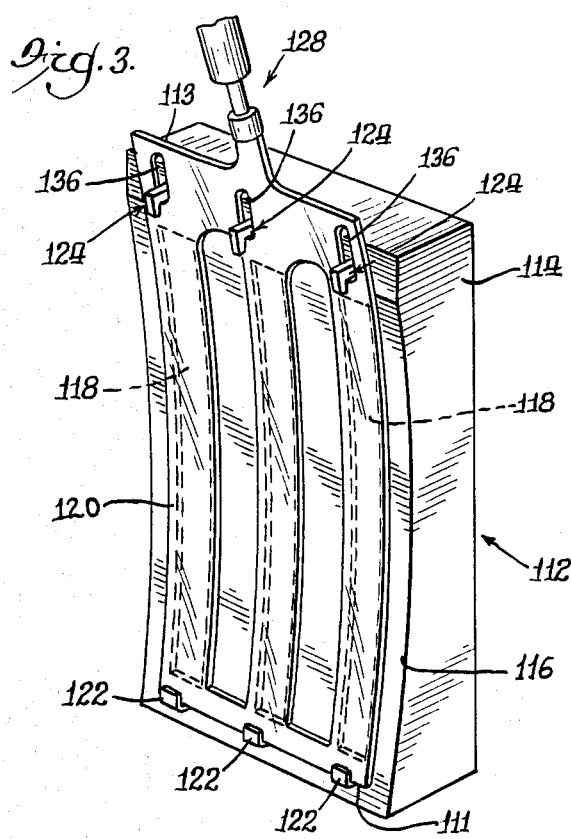
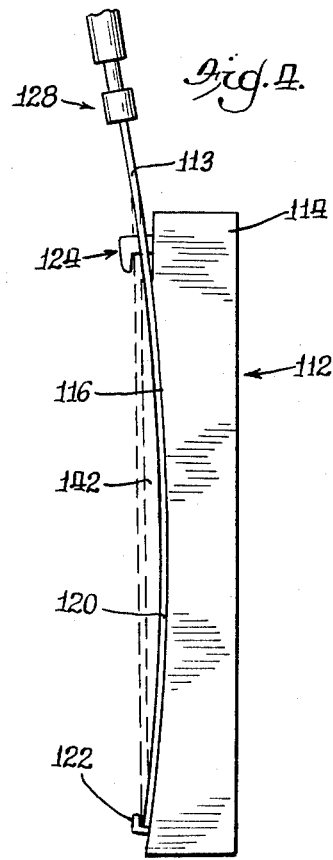

BOW ACTION VALVE

BACKGROUND OF THE INVENTION

1. Field of the Invention

This invention relates to valves, and more particularly to fast acting valves capable of operation under cryogenic conditions.

2. Description of the Prior Art

Valves generally control the flow of material from one place to another, and often provide a seal which restrains the flow of material entirely. Valves are needed which operate under a variety of pressure and temperature oonditions, including cryogenic environments.

In many applications, a valve is needed which opens and closes very rapidly and changes state many times during its useful life. The ability of a valve to meet these requirements may depend upon the number of moving parts in the valve, the manner in which the parts move, the stroke of the actuating mechanism required to change the state of the valve, and the manner in which a particular state of closure is maintained.

Generally, it is preferable for a valve to have a minimum number of moving parts for improved reliability, low cost and long useful life. The manner in which the parts move may be important because under certain temperature and pressure conditions, parts which slide over each other may stick together. Valves which operate in relatively clean environments present additional problems and are particularly susceptible to sticking when parts of the valve rub over each other. Valves having parts which press together without sliding over each other are less likely to stick together in use, and are therefore more reliable.

The valve of the present invention has many uses, and finds particular application in connection with cryogenic pumps operating at very low temperatures and pressures. For such application, it is necessary that impurities in the valve and impurities on the surface of the valve material not contaminate the environment. As all materials will be contaminated initially, it is desirable that it be possible to outgas the contaminants before using the valve. This is ordinarily achieved by baking at high temperatures, ruling out the use of such gasket materials as rubber or plastic in the valve. For this reason, metal to metal seals are preferred in the present invention.

It is also desirable in some applications to construct a valve so that it changes state of closure with a relatively small actuating stroke, and maintains a particular state in the absence of an actuating force. Typical applications for such valves include liquid or gas pipes, storage tanks, internal combustion engines and the like. The actuating stroke may be reduced through mechanical means, and a particular state may be maintained through the use of springs and the like. Added parts are often needed to accomplish these purposes, however, which decreases reliability and may require parts which slide over each other. Thus, there is a need for valves which change state with a relatively small actuating stroke and maintain a particular state in the absence of an external actuating force, with parts which generally press together, without substantial sliding.

Accordingly, one aspect of this invention is to provide a new and improved valve.

Another aspect of this invention is to provide a new and improved fast acting valve which maintains a particular state in the absence of an actuating force, having parts which generally press together without substantial sliding.

Still another aspect is to provide a bow action valve having parts which generally press together withqut sliding, as for use in cryogenic applications.

SUMMARY OF THE INVENTION

In keeping with one aspect of this invention, a flow control apparatus for controlling the flow of material has a valve body with at least one orifice and a closure plate for selectively closing the orifice. The closure plate is mounted on the valve body opposite the orifice at two opposite ends, with one end secured at a substantially fixed location on the valve body, and the other end free to move somewhat relative to the fixed end. The free end may be moved in the direction of the fixed end to bow the closure plate and thereby vary the distance between the plate and the orifice to control the flow of material through the orifice. The plate presses against the valve body under proper conditions to seal the orifice and is moved in relation to the valve body without substantial sliding action. The resiliency of the plate causes the valve to maintain a particular state in the absence of an actuating force. The plate may have a high aspect ratio, and the orifices may be elongated so that a relatively small actuating force is required to change the state of the valve.

BRIEF DESCRIPTION OF THE DRAWINGS

The above-mentioned and other features of this invention and the manner of obtaining them will become more apparent, and the invention itself will be best understood by reference to the following detailed description of a preferred embodiment of the invention, particularly when taken in conjunction with the accompanying drawings, in which:

FIG. 1 is a perspective view of a normally closed valve made according to this invention, shown in its closed position, with a portion of the valve broken away;

FIG. 2 is a side cross-sectional view of the valve of FIG. 1 in an open position, taken along line 2—2;

FIG. 3 is a perspective view of a normally open valve made according to this invention, shown in an open position;

FIG. 4 is a side view of the valve of FIG. 3 in its closed position;

FIG. 5 is an enlarged vertical sectional side view of a retainer hook of the valve of FIG. 1, taken along lines 5—5 in FIG. 1; and, FIG. 6 is an alternate embodiment of the retainer hook of FIG. 5.

DESCRIPTION OF THE PREFERRED EMBODIMENTS

The valves of this invention rely on the resiliency of a metal plate when bent either to close or to open the valves in the absence of an external force. FIG. 1 shows a normally closed valve 12 which selectively permits or restrains the flow of a gaseous, liquid or other material by forming at least a partial barrier to the natural flow of the material. The valve 12 includes a valve body 14, which may be a housing or the like, having a curved face 16 which is generally convex with respect to the valve body 14, and transverse to the direction of natural flow of the material. At least one orifice 18 is provided through which the material may pass. The orifice or orifices 18 may be any suitable number, size and shape, including the plurality of orifices 18 having the elongated shape shown in FIG. 1.

The valve body 14 may be of cast aluminum or any other suitable material. If the material and method of manufacture are selected properly, milling and other additional processing may not be needed after manufacture. The valve body 14 may be installed in a pipe or duct, a tank or other storage device, or the like.

A resilient closure plate 20 is flexibly mounted to the valve body 14 in at least two opposing places. The plate 20 may be of any suitable material which is capable of bowing in the environment in which it operates, without failing due to brittleness, softening or fatigue. The material of the plate 20 must also present a substantially impervious surface to the material being controlled by the valve 12, unless an additional element is secured to the plate 20 for that purpose. The plate 20 thus presents an impervious surface across each of the orifices 18, and may have a plurality of open spaces 34 between and spaced from the orifices 18.

Retainer hooks 22 restrain the plate 20 at an end 11 in substantially fixed pivotal relation to the orifices 18, and retainer hooks 24 restrain the plate 20 at an opposing end 13 providing limited freedom for the plate to bow away from the valve body 14. The retainer hooks 22 may be any suitable device or means which maintains the end 11 at a fixed location on the valve body 14, including the configuration shown in FIG. 1, and may also be a suitable welded or bolted fastening.

The plate 20 is bent over the curved face 16 and is shaped to close the orifices 18. The plate 20 is restrained by the hooks 22, 24 in a manner which puts a spring tension on the plate 20 to seal the orifices 18 when no bowing force is applied at the end 13. A plurality of slots 36 are provided so that the top end 13 of the plate 20 may be pushed generally downward by a bowing means 28, causing the plate 20 to bow away from the orifices 18.

The retainer hooks 24 may be any of a number of configurations which permit the top end 13 of the plate 20 to move generally downward as shown in FIG. 1 under the action of the bowing means 28 and move generally upward under the spring action of the closure plate 20 when the force of the bowing means 28 is released. The hooks 24 hold the upper end 13 of the plate 20 against the valve body 14 so that the plate 20 seals the orifices 18. A straight leg hook 51 shown in FIG. 5 may be used, provided that the leg 51 is adjusted at the proper angle with respect to the curved face 16. An alternative embodiment of the retainer hook 24, shown in FIG. 6, may also be used. The retainer hook 24 (FIG. 6) includes a bent leg 53 which creates a channel 55 between the bent leg 53 and the curved face 16. Adjustment of the bent leg 53 may be less critical than the adjustment of the straight leg 51 because the plate 20 may slide in the channel 55. A gap 57 between the plate 20 and the bent leg 53 will not affect the operation of the valve 12, but will permit slight thermal changes in the size of the valve components, without interfering with valve performance. It also assures that the longitudinal bowing forces at the end 13 be relieved.

The shape of the curved face 16 assures that the plate 20 bows when an appropriate force is applied to it by the bowing means 28. The bowing means 28 may include any suitable apparatus, including a flexible connecting means 30 and an air cylinder 32, as shown in FIG. 1. In the alternative, the bowing force may be a mechanical, hydraulic, or other suitable force which is strong enough to bow the plate 20 as required. The bowing means 28 may push the plate along a line which is generally tangent to the curved face 16, or along any other suitable line which tends to bow the plate 20 away from the valve body 14, rather than slide along it.

The curved face 16 may be any suitable shape relative to the relaxed shape of the plate 20 so that, when the plate 20 is not bowed by the bowing means 28, the hooks 24 assure that a minimum seating pressure is applied by the closure plate 20 at a seating surface 26 which surrounds each of the orifices 18. The seating surface 26 conforms to the shape of the closure plate 20 in the closed position to form a seal with the portion of the plate 20 which is pressed against it.

When a bowing force is not applied, the plate 20 seals the orifices 18, closing the valve 12. One side of the plate 20 will generally be subjected to greater pressure from the material which is restrained than the other side. If the greater pressure is applied against the inside 38 of the plate 20, the resilient force stored in the plate 20 must be sufficient to overcome the material force and seal the orifices 18. If the material force is applied against the outside 40 of the plate 20, less resilient force in the plate 20 may be required.

The valve 12 is normally closed by the resilient energy of the plate 20, with the plate 20 pressed against the curved face 16. When a sufficient force is applied to the plate 20 by the bowing means 28, the plate 20 bows outward, as in FIG. 2, and creates a space 42 between the curved face 16 and the plate 20. The orifices 18 are exposed, permitting material to flow through the valve 12. The plate 20 is lifted substantially from the curved face 16, without sliding substantially across seating surfaces 26 or other portions of the valve body 14. The bowing force may be applied with a component generally away from the valve body 14, or generally downward, so that the plate 20 is lifted away from the plate 20 in the vicinity of the hooks 24. In this manner, sliding action is reduced to a minimum, and the possibility of the plate 20 being stuck to the valve body 14 is greatly reduced.

The plate 20 should be lifted enough so that the orifices 18 are appropriately exposed for the free flow of material. The space 42 between the plate 20 and the orifices 18 at full open should be at least about one half of the aperture width across the center 16a of the face 16, so that the total area of the spaces 42 adjacent each orifice 18 approximates the area of the respective orifice 18 itself. The open spaces 34 should be large enough so that the flow of material through the orifices 18 is not substantially inhibited. The plate 20 may be lifted less if it is desired to vary the flow of material without fully opening the valve 12.

The valve 12 may be designed so that the drive stroke of the bowing means 28 fully opens the valve 12 with a relatively short stroke, to decrease the response time of the valve. In a proposed design, a plate movement of about 0.78 inch adjacent the bowing means 28 causes a maximum separation of about 1.38 inch in the space 42 between the plate 20 and the curved face 16. The valve body 14 has a height of about 20 inches, and the parabolic shape of the curved face 16 produces about a 1.38 inch maximum initial deflection or bias in the plate 20. The width of the orifices 18 is 1.9 inch.

A normally open valve 112 is shown in FIGS. 3 and 4. The valve 112 is similar to the valve 12 of FIGS. 1 and 2, except that a plate 120 is secured to a valve body 114 so that a space 142 is created between the plate 120 and a curved face 116 when endwise force is reduced. The valve 112 is closed by impressing a bowing force on the plate 120 through a bowing means 128, forcing the plate 120 to bow and press against the curved face 116.

The valve body 114 has at least one orifice 118 in the curved face 116. The curved face 116 is shaped generally concave with respect to the valve body 114. One end 111 of the resilient plate 120 is secured in a generally fixed pivotal relation to the valve body 114 by a plurality of retainer hooks 122, and the opposing end 113 of the plate 120 is restrained by a plurality of retainer hooks 124. The retainer hooks 122 may be any suitable shape. The retainer hooks 124 may also be any suitable shape, provided that they retain the plate 120 in the open state shown in FIG. 3, and the closed state shown in FIG. 4. A plurality of slots 136 are provided for the hooks 124 so that the plate 120 may be pushed generally downward by the bowing means 128, causing the plate 120 to bow toward the orifices 118 in the curved face 116, as in FIG. 4. The plate 120 should be secured so that it has at least a slight bow toward the curved face 116 in the normally open position so that the plate 120 bows properly when an external force is applied by the bowing means 128. Many of the design considerations of the valve 112 are similar to those of the valve 12.

The many advantages of this invention are now apparent. The possibility of sticking is greatly reduced because the parts of the valve press together, without substantial sliding. The shape of the curved face provides at least a minimum force at the seating surfaces of the valve, and no external force is required to maintain the valve in its normal state. The valve is fast acting, requiring a relatively short drive stroke to change state, and has very few moving parts, for long useful life.

It is, of course, understood that although preferred embodiments of the present invention have been illustrated and described herein, various modifications thereof will be apparent to those of ordinary skill in the art and, accordingly, the scope of the present invention should be defined only by the appended claims and equivalents thereof. For example, the mating surfaces between the closure plate and the valve body may be any suitable shapes as provide sealing therebetween when the closure plate is bowed or relaxed, as the case may be. Such surfaces may be on appendages to the closure plate and/or the valve body. The retainer hooks could be any configuration which provides the forces needed to hold the plate in place as required, and could be secured directly to the valve body or indirectly by way of adjacent apparatus. Also, the bowing force applied to the plate need not be in the precise direction shown, and could include components in various directions, provided that a suitable component is provided in the direction of the secured edge. A preferred direction is directly toward the secured end.

Various features of the invention are set forth in the following claims.

What is claimed is:

1. A flow control valve apparatus for controlling the flow of material comprising
   a valve body having a substantially parabolic curved surface with at least one orifice,
   resilient plate means comprising a flat metal plate adapted to be bowed into a substantially parabolic curved shape and having two opposite ends and a substantially impervious surface therebetween,
   means for mounting said resilient metal plate relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and
   means for applying an endwise compressive force to said metal plate for moving said free opposite end with a component of motion in the direction of said fixed opposite end to bow said resilient plate means so as to alter the curvature of said resilient plate and thereby vary the distance between said substantially impervious surface and said valve body to control the flow of material through said orifice, said metal plate being bowed into a substantially parabolic shape to seal against the substantially parabolic curved surface on said valve body.

2. The apparatus of claim 1 wherein said means for mounting constrains the motion of said free end relative to said valve body to hold said resilient plate means in a bowed and stressed condition when no force is applied by said means for moving, with the spring force of said resilient plate means maintaining said substantially impervious surface in a normally open or a normally closed state.

3. The apparatus of claim 1 wherein said valve body comprises a housing having a curved face, said orifice being in said curved face.

4. The apparatus of claim 3 wherein said curved face is convex with respect to said housing, and said plate means comprises a plate mounted over said curved face so that said orifice is normally closed when no force is applied by said means for moving.

5. The apparatus of claim 3 wherein said curved face is concave with respect to said housing, and said plate means comprises a plate mounted over said curved face so that there is a space between said impervious surface and said valve body when no force is applied by said means for moving, whereby said valve is normally open.

6. The apparatus of claim 1 wherein said valve body has a plurality of said orifices.

7. The apparatus of claim 1 wherein said mounting means comprises a plurality of free end retainer hooks secured to said valve body through slots in said plate means.

8. The apparatus of claim 7 wherein each of said free end retainer hooks comprises a substantially straight leg secured at an angle with respect to said valve body so that said plate means may move toward and away from said fixed end without bowing substantially away from said valve body at said free end.

9. The apparatus of claim 7 wherein each of said free end retainer hooks comprises a bent leg secured to said valve body to form a channel in which said plate means may move toward and away from said fixed end without bowing substantially away from said valve body at said free end.

10. A flow control valve apparatus for controlling the flow of material comprising
    a valve body defining at least one orifice,
    resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body to control the flow of material through said orifice, said valve body having a plurality of said orifices, said plate means providing a plurality of openings in said impervious surface between and spaced from said orifices.

11. A flow control valve apparatus for controlling the flow of material comprising:

a valve body defining at least one orifice, resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body to control the flow of material through said orifice, said valve body having a plurality of said orifices, said orifices being elongated so that the longest dimension of said orifices lies generally in the direction of motion of said free end of said plate means.

12. A flow control valve apparatus for controlling the flow of material comprising a valve body defining at least one orifice, resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body control the flow of material through said orifice, said plate means providing a plurality of openings in said impervious surface between and spaced from said orifices, said resilient plate means comprising a metal plate.

13. A flow control valve apparatus for controlling the flow of material comprising a valve body defining at least one orifice, resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body to control the flow of material through said orifice, said valve body having a plurality of said orifices, said orifices being elongated so that the longest dimension of said orifices lies generally in the direction of motion of said free end of said plate means, said resilient plate means comprising a metal plate.

14. A flow control valve apparatus for controlling the flow of material comprising a valve body defining at least one orifice, resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body control the flow of material through said orifice, said plate means providing a plurality of openings in said impervious surface between and spaced from said orifices, said valve body having a metal surface for mating with a surface of said plate.

15. A flow control valve apparatus for controlling the flow of material comprising a valve body defining at least one orifice, resilient plate means having two opposite ends and a substantially impervious surface therebetween, means for mounting said resilient plate means relative to said valve body with said substantially impervious surface opposite said orifice, with one of said opposite ends secured at a substantially fixed location relative to said valve body, and with the other of said opposite ends free to move relative to said valve body with at least a component of motion in the direction of said substantially fixed opposite end, and means for moving said free opposite end with a component of motion in the direction of said fixed opposite end to bow said resilient plate means and thereby vary the distance between said substantially impervious surface and said valve body to control the flow of material through said orifice, said orifices being elongated so that the longest dimension of said orifices lies generally in the direction of motion of said free end of said plate means, said valve body having a metal surface for mating with a surface of said plate.

* * * * *

UNITED STATES PATENT AND TRADEMARK OFFICE
CERTIFICATE OF CORRECTION

PATENT NO. : 4,510,972
DATED : April 16, 1985
INVENTOR(S) : Richard L. Creedon

It is certified that error appears in the above-identified patent and that said Letters Patent is hereby corrected as shown below:

Column 2, line 5: "withgut" should read --without--

Claim 12, column 7, line 63: after "body" insert --to--

Claim 14, column 8, line 45: after "body" insert --to--

Signed and Sealed this

Twenty-seventh Day of August 1985

[SEAL]

Attest:

DONALD J. QUIGG

Attesting Officer     Acting Commissioner of Patents and Trademarks